Sept. 12, 1950 W. ANGST 2,522,337
MACH METER

Filed Dec. 9, 1944 2 Sheets-Sheet 1

INVENTOR.
WALTER ANGST.
BY
ATTORNEY.

Sept. 12, 1950 W. ANGST 2,522,337
MACH METER
Filed Dec. 9, 1944 2 Sheets-Sheet 2

INVENTOR.
WALTER ANGST.
BY Myron J. Seibold
ATTORNEY.

Patented Sept. 12, 1950

2,522,337

UNITED STATES PATENT OFFICE 2,522,337

MACH METER

Walter Angst, Manhasset, N. Y., assignor to Square D Company, Detroit, Mich., a corporation of Michigan Application December 9, 1944, Serial No. 567,431

3 Claims. (Cl. 73—182)

This invention relates to a Mach meter for aircraft for indicating the ratio of the true airspeed of the craft to the speed of sound in the medium in which the aircraft is traveling and the object of the invention is the provision of an instrument of this type for indicating the Mach number of an aircraft in flight.

The maximum safe Mach number of any aircraft is the value of the ratio of true airspeed to the speed of sound at which the laminar flow of air over the wings fails and shock waves are encountered. This indicates an undesirable and dangerous condition because of control difficulties and structural stresses. The instrument, according to the present invention, permits the determination of this maximum safe Mach number for any given aircraft, which number when applied correctly to a conventional airspeed indicator shows the maximum safe indicated airspeed.

The conventional airspeed indicator measures the difference between the Pitot and static pressures of a Pitot static tube and is conventionally referred to as the indicated airspeed. To interpret this measurement in terms of true airspeed, it is necessary to compensate for variation in air temperature and altitude pressure. The speed of sound varies with air temperature but is independent of altitude pressure. Since true airspeed and the speed of sound are equally affected by air temperature no compensation for temperature is necessary in the determination of the Mach number or ratio of the true airspeed to the speed of sound.

Other objects and features of the invention will be readily apparent to those skilled in the art from the specification and appended drawing illustrating certain preferred embodiments in which.

Figure 1:
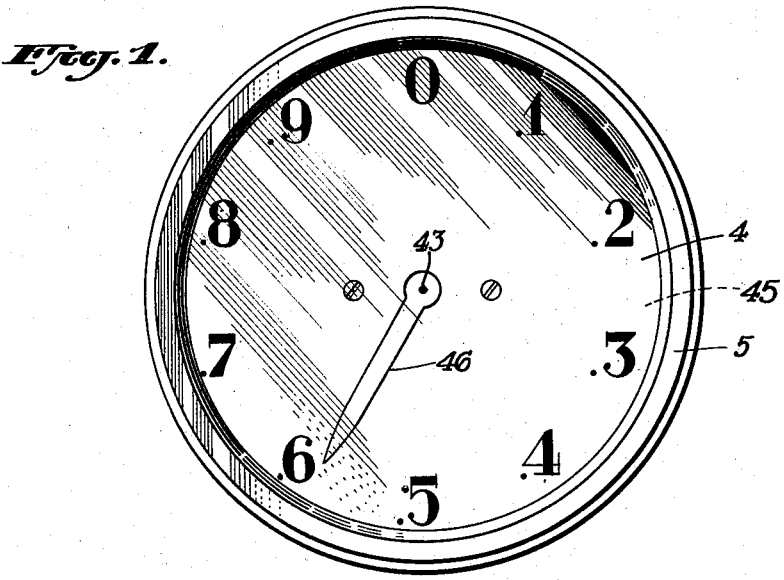
Figure 1 is a representation of a dial face and indicator of the Mach meter according to the present invention.

The instrument comprises an outer casing 1 which is sealed airtight through the gasket retainer ring 2, rubber gasket 3, glass 4 and bezel ring 5. Within the casing is disposed a supporting framework constituted by plates 6 and 7 spaced apart in a rigid cage arrangement by a plurality of posts 8. Upon one of the posts 8 are mounted a pair of serially connected aneroid capsules 9 and upon another of the posts 8 is mounted a diaphragm capsule 11. The aneroid capsules 9 are sealed and the interior of the casing is placed in communication with the static opening of a Pitot static tube through an opening in the casing, not shown. The interior of the diaphragm capsule 11 is connected through the tubing 12 to the Pitot or pressure opening of the Pitot static tube through the opening 13 in the back wall of the casing.

Figure 2:
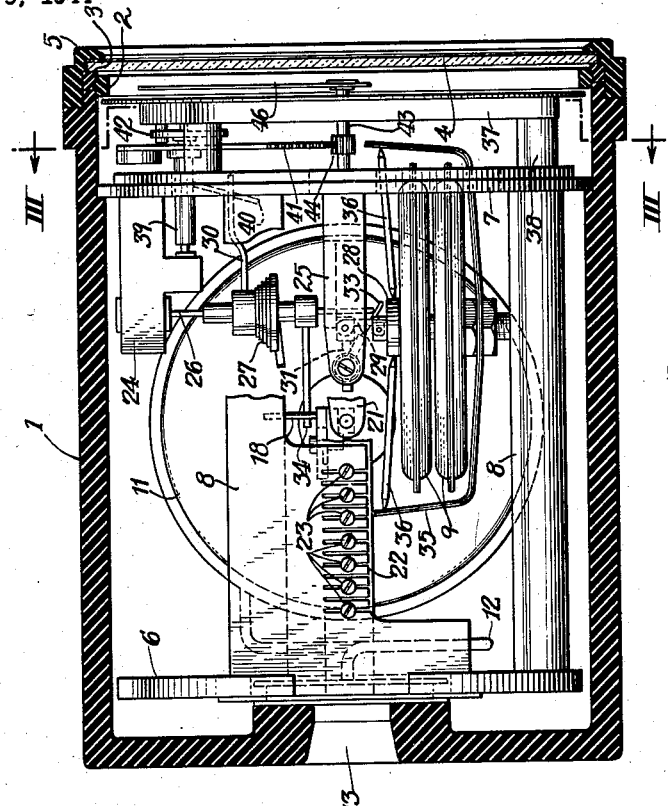
Figure 2 is a longitudinal sectional view through the instrument of Figure 1.
Figure 4:
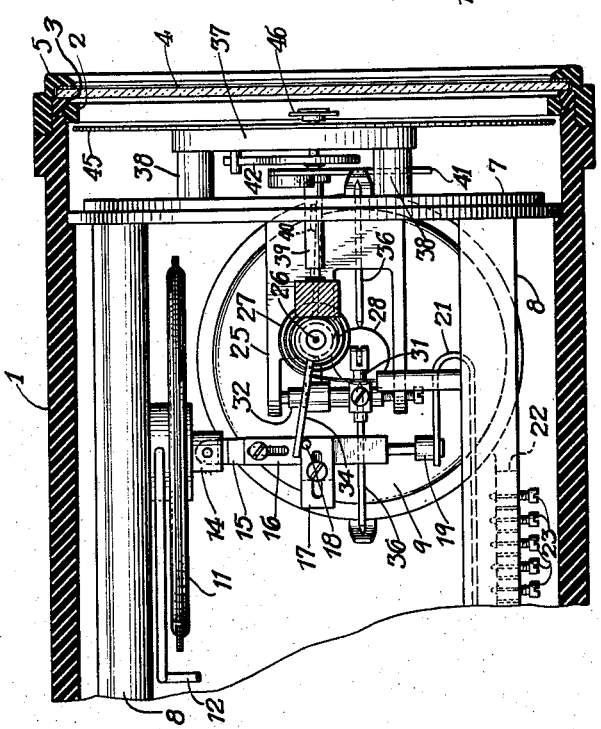
Figure 4 is a longitudinal sectional view through the instrument at right angles to the section of Figure 2.

A lug 14 is connected to the diaphragm capsule 11 and has pivoted therein a link 15 to which is adjustably attached a link 16. Upon the link 16 is adjustably mounted a plate 17 carrying a lever arm 18. An extension on the link 16 terminates in an abutment 19 against which bears a spring 21 of U-shape. One of the supporting posts 8 has a platelike transverse extension 22 at the edge of which are disposed a plurality of adjustable studs 23 forming stops for the elongated leg of the U-shaped spring 21 and serving to calibrate the movement of the diaphragm capsule 11. Upon the rear surface of the plate 7 are a pair of supports 24 and 25. Within the supports 24 and 25 is mounted a shaft 26 for rotative and limited longitudinal movement. A light spring 27 biases the shaft 26 for rotation in a counterclockwise direction as viewed in Figure 4 and also for movement downwardly as viewed in Figure 2. A lever arm 30 is rigidly mounted on the shaft 26 and is rotatable therewith.

The uppermost portion of the aneroid capsules 9 is provided with a hub 28 connected by a short link 29 to an arm 31 on a shaft 32 pivoted in the support 25. Also mounted on the shaft 32 is an arm 33 engaging the lower end of the shaft 26 as viewed in Figure 2. Rigidly mounted on the shaft 26 is a lever arm 34 engaging with the lever arm 18 to be moved thereby to effect rotation of the shaft 26. A bimetallic fork 35 is provided about the aneroid capsules 9 between the ends of which and the hub 28 are disposed the force applying pins 36 to provide temperature compensation for the movement of the aneroid capsules.

Figure 3:
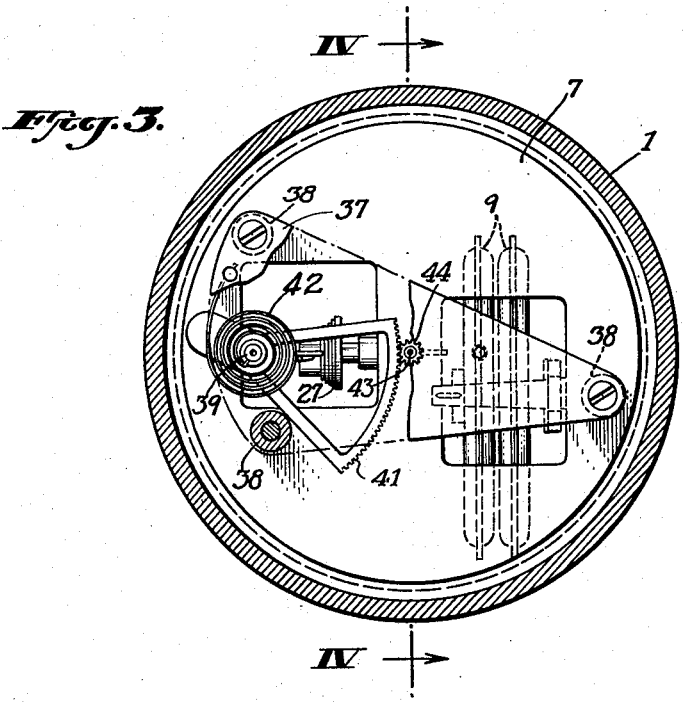
Figure 3 is a transverse sectional view on the line III—III of Figure 2.

Forwardly of the plate 7 is disposed a generally diagonally shaped plate 37 upon posts 38. In the plate 7 and the support 24 is pivotally mounted a shaft 39 upon which is secured a gear sector 41, the shaft 39 being biased for rotation in a clockwise direction as viewed in Figure 3 by the coil spring 42. A lever arm 40 is mounted on the shaft 39 and positioned to engage the lever arm 30 for movement thereby. In the plates 7 and 37 is pivotally mounted a shaft 43 carrying a pinion 44 meshing with the gear sector 41. Upon the plate 37 is mounted a stationary dial 45 bearing indicia of Mach number as indicated in Figure 1. The forward end of the shaft 43 extends through the plate 37 and dial 45 and carries a pointer 46 rotatable with respect to the indicia upon the dial 45 to indicate the Mach number of the aircraft.

The operation of the instrument will now be described:

As the speed of the aircraft is increased, the pressure difference between the Pitot and the static pressures of the Pitot static tube increases to effect an expansion of the diaphragm capsule 11. This movement of the diaphragm capsule moves the lever arm 18 downwardly as viewed in Figure 4 and permits movement of the lever arm 34 to effect a rotation of the shaft 26 in a counterclockwise direction under the bias of spring 27. Rotation of the shaft 26 effects rotation of the lever arm 30 in the same direction and this will effect movement of the lever arm 40 upwardly as viewed in Figure 4 to rotate the shaft 39. Rotation of the shaft 39 is accompanied by rotation of the gear sector 41 which in turn rotates pinion 44 on shaft 43 to rotate pointer 46 with respect to the dial 45 and the Mach number indicia thereon.

Upon a change in the altitude pressure, the pressure within the casing connected to the static opening of the Pitot static tube will be changed and will be accompanied by movement of the aneroid capsule 9. Upon a decrease in altitude pressure the aneroid capsules will expand to rotate the shaft 32, in a counterclockwise direction as viewed in Figure 2, by movement of the lever arm 31 through the link 29. As the shaft 32 rotates, the lever arm 33 will move therewith to move the shaft 26 bodily upwardly as viewed in Figure 2. The lever arm 30 will move upwardly with the shaft 26 and will decrease the distance between its point of engagement with the lever arm 40 and the axis of the shaft 39 and hence will increase the angle of rotation of the shaft 39 occasioned by a given angular rotation of the shaft 26. Therefore, by the longitudinal movement of the shaft 26 in response to expansion and contraction of the diaphragm capsules 9, the rotation of the pointer 46 effected by expansion and contraction of the diaphragm capsule 11 will be modified. Thus, a decrease in altitude pressure will result in greater rotation of the pointer 46 for a given movement of the diaphragm capsule 11, while with increased altitude pressure the movement of the pointer for a given diaphragm capsule movement will be decreased.

The instrument according to the present invention will continuously indicate the Mach number of an aircraft in flight or the ratio of the true airspeed of the aircraft to the speed of sound in the local medium in which the aircraft is traveling. When used to determine the maximum safe Mach number of an aircraft, the aircraft is speeded up until discontinuity of laminar flow of air and the occurrence of shock waves is initiated at which time the reading of the instrument will indicate the maximum safe Mach number for the aircraft. The known maximum safe Mach number may be utilized with the present instrument or with other instruments to indicate the maximum safe airspeed.

While a certain preferred embodiment of the invention has been specifically disclosed, it is understood that the invention is not limited thereto, as many variations will be readily apparent to those skilled in the art and the invention is to be given its broadest possible interpretation within the terms of the following claims.

What is claimed is:

1. In a Mach meter for aircraft, a dial bearing indicia of Mach number, an indicator movable relatively to said dial to indicate a Mach number reading thereon, means responsive to the Pitot pressure of an aircraft in flight for effecting movement of said indicator, and means responsive to the altitude pressure of the aircraft for varying the response of the indicator to a given change in the Pitot pressure, said last mentioned means increasing the indicator movement as the altitude pressure decreases.

2. A Mach meter for aircraft comprising a dial bearing Mach number indicia, an indicator movable relatively to said dial to indicate a Mach number reading thereon, a diaphragm capsule for effecting movement of said indicator, and an aneroid capsule for varying the response of said indicator to a given movement of said diaphragm capsule, said aneroid capsule increasing the indicator movement as the altitude pressure decreases.

3. A Mach meter for aircraft comprising a dial bearing Mach number indicia, an indicator movable relatively to said dial to indicate a Mach number reading thereon, a diaphragm capsule adapted to be connected to the pressure line of a Pitot tube, means for effecting movement of said indicator in response to change in the Pitot tube pressure, an aneroid capsule responsive to the altitude pressure of the aircraft, and means for varying the response of said indicator to movement of said aneroid capsule as the altitude pressure changes, said aneroid capsule movement increasing the indicator response as the altitude pressure decreases.

WALTER ANGST.

REFERENCES CITED

The following references are of record in the file of this patent:

UNITED STATES PATENTS

| Number | Name | Date |
|---|---|---|
| 1,489,463 | Sherrin | Apr. 8, 1924 |
| 2,177,244 | Ciamberlini | Oct. 24, 1939 |
| 2,302,713 | Paulin | Nov. 24, 1942 |
| 2,379,323 | Weingart | June 26, 1945 |
| 2,385,345 | Schairer | Oct. 2, 1945 |

FOREIGN PATENTS

| Number | Country | Date |
|---|---|---|
| 217,358 | Great Britain | June 19, 1924 |
| 532,638 | France | Nov. 18, 1921 |
| 823,949 | France | Oct. 25, 1927 |

OTHER REFERENCES

National Advisory Committee for Aeronautics Wartime Report L-423 entitled "NACA Mach Number Indicator for Use in High-speed Tunnels" by Norman F. Smith, originally issued July 1943 as Advance Confidential Report 3G31.